United States Patent
Liu et al.

(10) Patent No.: US 8,903,887 B2
(45) Date of Patent: Dec. 2, 2014

(54) EXTRACTING WEB SERVICES FROM RESOURCES USING A WEB SERVICES RESOURCES PROGRAMMING MODEL

(75) Inventors: Jeffrey Yu Kwan Liu, Unionville (CA); Yen Lu, North York (CA); Jason Ashley Sholl, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/549,348

(22) Filed: Jul. 13, 2012

(65) Prior Publication Data
US 2012/0278489 A1 Nov. 1, 2012

Related U.S. Application Data

(63) Continuation of application No. 10/898,737, filed on Jul. 23, 2004, now Pat. No. 8,260,838.

(51) Int. Cl.
*G01C 21/00* (2006.01)
*G06F 17/30* (2006.01)
*H04L 29/08* (2006.01)

(52) U.S. Cl.
CPC .......... *G06F 17/30861* (2013.01); *H04L 67/36* (2013.01)
USPC .......................................................... 709/201

(58) Field of Classification Search
CPC .................................................. G06F 17/30861
USPC ............................................................ 709/201
See application file for complete search history.

(56) References Cited

U.S. PATENT DOCUMENTS

| | | | |
|---|---|---|---|
| 7,493,397 B1 * | 2/2009 | Guthrie et al. | 709/227 |
| 2002/0161745 A1 * | 10/2002 | Call | 707/1 |
| 2004/0243466 A1 * | 12/2004 | Trzybinski et al. | 705/14 |

* cited by examiner

*Primary Examiner* — Maceeh Anwari
(74) *Attorney, Agent, or Firm* — Steven M. Greenberg, Esq.; CRGO Law

(57) ABSTRACT

A programming model allows application programmers to extract Web services from various types of resources. The programming model defines relationships between various resource types and methods for each resource type to extract a Web service or another linked resource. The programming model also provides caching capability to store previously extract resources for future requests.

41 Claims, 10 Drawing Sheets

```
                                    600
                                    ↙
        <html>          604         606
  602    <head>          \           )
     ↘<meta name="serviceInspection" content="inspection.wsil">
  608 ↙<link type="text/xml" rel="alternate" href="disco.disco"/>↘
        </head>                                                   610   } FIG. 6
        <body>
          This is a sample.
        </body>
        </html>
```

700
                                              ↙
                        FIG. 7
  ═══════════════════════════════════════════════════════════════

<?xml version='1.0' encoding='UTF-8'?>
  <inspection xmlns='http://schemas.xmlsoap.org/ws/2001/10/inspection/' xmlns:wsiluddi='http://
  schemas.xmlsoap.org/ws/2001/10/inspection/uddi/' xmlns:wsilxmethods='http://
  schemas.xmethods.net/ws/2001/10/inspection/'>
    <service>
      <description referencedNamespace='http://schemas.xmlsoap.org/wsdl/'
       location='webservice1.wsdl'/>↘
      </service>                      702
      <service>
        <description referencedNamespace="urn:uddi-org:api">
  704 ↙  <wsiluddi:serviceDescription location="http://uddi.ibm.com/testregistry/inquiryapi">
          <wsiluddi:serviceKey>XXXXXXXX-XXXX-XXXX-XXXX-XXXXXXXXXXXX</
  wsiluddi:serviceKey>
        </wsiluddi:serviceDescription>
      </description>
      </service>
      <link referencedNamespace="urn:uddi-org:api_v2">
  706 ↙ <wsiluddi:businessDescription location="http://uddi.ibm.com/testregistry/inquiryapi">
          <wsiluddi:businessKey>XXXXXXXX-XXXX-XXXX-XXXX-XXXXXXXXXXXX</
  wsiluddi:businessKey>
        </wsiluddi:businessDescription>
      </link>
  708 ↘<link referencedNamespace="http://schemas.xmlsoap.org/ws/2001/10/inspection/"
      location="inspectionLink.wsil"/>↘
      </inspection>                    710

```
<?xml version='1.0' encoding='UTF-8'?>
<inspection xmlns='http://schemas.xmlsoap.org/ws/2001/10/inspection/'
 xmlns:wsiluddi='http://schemas.xmlsoap.org/ws/2001/10/inspection/uddi/'
 xmlns:wsilxmethods='http://schemas.xmethods.net/ws/2001/10/inspection/'>
  <service>
    <description referencedNamespace='http://schemas.xmlsoap.org/wsdl/'
location='webservice2.wsdl'/>
  </service>
</inspection>
```

```
<disco:discovery xmlns:disco="http://schemas.xmlsoap.org/disco/"
 xmlns:scl="http://schemas.xmlsoap.org/disco/scl/">
  <scl:contractRef ref="webservice1.wsdl" docRef="webservice1.wsdl"/>
  <scl:contractRef ref="webservice2.wsdl" docRef="webservice2.wsdl"/>
</disco:discovery>
```

```
index.html ─1002
│
│
├──> inspection.wsil ─1004
│    │      1006
│    │     /
│    ├──> UDDI service (service key: XXXXXXXX-XXXX-XXXX-XXXX-XXXXXXXXXXXX)
│    │
│    ├──> UDDI business (business key: XXXXXXXX-XXXX-XXXX-XXXX-XXXXXXXXXXXX)
│    │      \
│    │      1008
│    ├──> webservice1.wsdl ─1010
│    │
│    ├──> inspectionLink.wsil ─1012
│    │    │
│    │    └──> webservice2.wsdl ─1018
│    │
├──> disco.disco ─1006
│    │
│    ├──> webservice1.wsdl ─1014
│    │
│    └──> webservice2.wsdl ─1016
```

```
public static void main(String[] args)
{
    Vector wsdls = new Vector(); // put all the WSDLResource into this Vector
    WebServicesParser parser = new WebServicesParser(); // instantiates the WebServicesParser
    WebServiceResource wsResource = parser.parse("http://localhost:9080/wp/index.html"); // parse
    the URI of a Web service resource, in this case, we are parsing the URI of index.html
    gatherWSDLs(wsResource); // gather all the WSDLResource
    // process the WSDLs that you've gathered...
} private void gatherWSDLs(WebServiceResource wsResource, Vector wsdls)
{
    if (wsResource instanceof WSDLResource)
        wsdls.add(wsResource); // add the WSDLResource to the Vector
    else
    {
        WebServiceResource[] wsResources = wsResource.getLinkedResources(); // get the
        referenced Web services resources
        for (int i = 0; i < wsResources.length; i++)
            gatherWSDLs(wsResources[i], wsdls); // gather WSDLResource recursively
    }
} public WebServiceResource[] getLinkedResources() throws WWWAuthenticationException,
Exception
{
    if (cachedData_ == null)
    {
        String htmlURI = getURI();
        WebServicesParser parser = createWebServicesParser(htmlURI);
        parser.parse(WebServicesParser.PARSE_NONE);
        WebServiceEntity htmlEntity = parser.getWebServiceEntityByURI(htmlURI);
        populateCache(htmlEntity);
    }
    int cachedDataSize = cachedData_.size();
    if (cachedDataSize == 0)
        return null;
    WebServiceResource[] linkedResources = new WebServiceResource[cachedDataSize]
    cachedData_.copyInto(linkedResources);
    return linkedResources;
}
```

*FIG. 11*

```
public static void main(String[] args)                          1200
{                   1202
    WebServicesParser parser = new WebServicesParser();
    WebServiceResource wsResource = parser.parse("http://localhost:9080/wp/index.html");
1206  create TreeNode(wsResource);
}                                                                 1204 private createTreeNode(WebServiceResource wsResource)
{
    // depending on the type of Web services resource, build a tree view out of it, see
    sampleCode2Figure.gif
    if (wsResource instanceof HTMLResource)  1210
        createHTMLTreeNode(...);
    else if (wsResource instanceof UDDIServiceResource)  1212
        createUDDITreeNode(...);
    else if (wsResource instanceof WSILResource)  1214
1208    createWSILTreeNode(...);
    else if (wsResource instanceof DISCOResource)  1216
        createDISCOTreeNode(...);
    else if (wsResource instanceof WSDLResource)  1218
        createWSDLTreeNode(...);
    WebServiceResource[] wsResources = wsResource.getLinkedResources();  1220
    for (int i = 0; i < wsResources.length; i++)
        createTreeNode(wsResources[i]);
}
             1222
private createHTMLTreeNode(...)  1211
{
    // process the HTMLResource, for example, display the HTML document using the getResource()
    method
} private createUDDITreeNode(...)  1213
{
    // process the UDDIServiceResource, for example, display its service key using the getServiceKey()
    method
} private createWSILTreeNode(...)  1215
{
    // process the WSILResource
} private createDISCOTreeNode(...)  1217
{
    // process the DISCOResource
} private createWSDLTreeNode(...)  1219
{
    // process the WSDLResource
}
```

*FIG. 12*

EXTRACTING WEB SERVICES FROM RESOURCES USING A WEB SERVICES RESOURCES PROGRAMMING MODEL

This application is a Continuation of U.S. application Ser. No. 10/898,737, filed on Jul. 23, 2004, entitled "EXTRACTING WEB SERVICES FROM RESOURCES USING A WEB SERVICES RESOURCE PROGRAMMING MODEL," the entirety of which is incorporated herein by reference.

BACKGROUND OF THE INVENTION

The present invention relates generally to a data processing system, and more particularly, to a method and apparatus for extracting Web services from resources using a Web services resource programming model.

With Web services, businesses may perform transactions with consumers or other businesses. A service provider may publish available services on the Internet using Web services for an end user to subscribe. For example, a customer may subscribe to obtain stock quotes from a financial institution using Web services.

Web services are provided through a number of standards. An example of a Web services standard is Web Services Description language (WSDL). WSDL, a standard published by the World Wide Web Consortium (W3C), allows a service provider to describe Web services in an extensible markup language (XML) format as a set of endpoints operating on messages. WSDL allows endpoints and messages to be described regardless of the message formats or network protocols.

Another common Web services standard is Universal Description Discovery and Integration (UDDI). UDDI is a standard published by OASIS consortium, which consists of a UDDI community of more than 300 businesses. UDDI provides a platform independent way of describing and discovering Web services and Web service providers. UDDI uses WSDL as interfaces to describe Web services in the registry, for example, a WSDL file may be embedded as a link in a UDDI business service entry. Thus, UDDI is another type of resource within which Web services may be accessible to a user.

In addition to UDDI, other resource models, such as Web services inspection language (WSIL) and discovery of Web services (DISCO), provides other mechanisms for service providers to describe their services and for consumers to discover these services. WSIL allows a service requestor to discover Web services definitions on a Web server, which enables the requestor to easily browse Web servers for Web services.

WSIL is different from UDDI because instead of using a central registry to publish Web services, service providers may provide the service lookup directly on their Web server. When a service requestor makes a request to a service provider for a particular service, the service provider provides a WSIL inspection document that has embedded links that link to other WSIL documents. Each linked WSIL may advertise a different local Web service or a service already described in a UDDI registry. Thus, WSIL allows service providers to organize their services in a hierarchical manner and allows service discovery to be performed in a decentralized manner. Discovery of Web services (DISCO) is similar technology for publishing and discovering Web services provided by Microsoft Corporation. Currently, a service requestor relies on either a uniform resource locator (URL) or a uniform resource identifier (URI) in a Web page to search for a Web service.

SUMMARY OF THE INVENTION

According to one aspect of the present invention, a method in a data processing system for extracting Web services from resources using a programming model comprises receiving a request from a user for extraction of Web services from a resource, invoking a Web service parser of the programming model to parse the request to determine a type of the resource, and determining if the resource comprises other resources based on the type of the resource.

According to another aspect of the present invention, a data processing system for extracting Web services from resources using a programming model comprises means for receiving a request from a user for extraction of Web services from a resource, means for invoking a Web service parser of the programming model to parse the request to determine a type of the resource, and means for determining if the resource comprises other resources based on the type of the resource.

According to yet another aspect of the present invention, a computer program product for extracting Web services from resources using a programming model comprises a computer readable medium having computer readable program code embodied therein. The computer readable program code comprises computer readable program code configured to receive a request from a user for extraction of Web services from a resource, computer readable program code configured to invoke a Web service parser of the programming model to parse the request to determine a type of the resource, and computer readable program code configured to determine if the resource comprises other resources based on the type of the resource.

Other aspects and features of the present invention, as defined solely by the claims, will become apparent to those ordinarily skilled in the art upon review of the following non-limited detailed description of the invention in conjunction with the accompanying figures.

BRIEF DESCRIPTION OF THE SEVERAL VIEWS OF THE DRAWINGS

FIG. 6 is a diagram illustrating an exemplary HTML resource in accordance with an aspect of the present invention;

FIG. 7 is a diagram illustrating an exemplary WSIL resource in accordance with an aspect of the present invention;

FIG. 8 is a diagram illustrating an exemplary embedded WSIL resource is depicted in accordance with an aspect of the present invention;

FIG. 9 is a diagram illustrating an exemplary DISCO resource in accordance with an aspect of the present invention;

FIG. 10 is a diagram illustrating an exemplary hierarchy of resources in accordance with an aspect of the present invention;

FIG. 11 is an exemplary program using Web services resource programming model to return a list of embedded resources in accordance with an aspect of the present invention;

FIG. 12 is an exemplary program using Web services resource programming model to build a graphical tree in accordance with an aspect of the present invention;

DETAILED DESCRIPTION OF THE INVENTION

Figure 1:
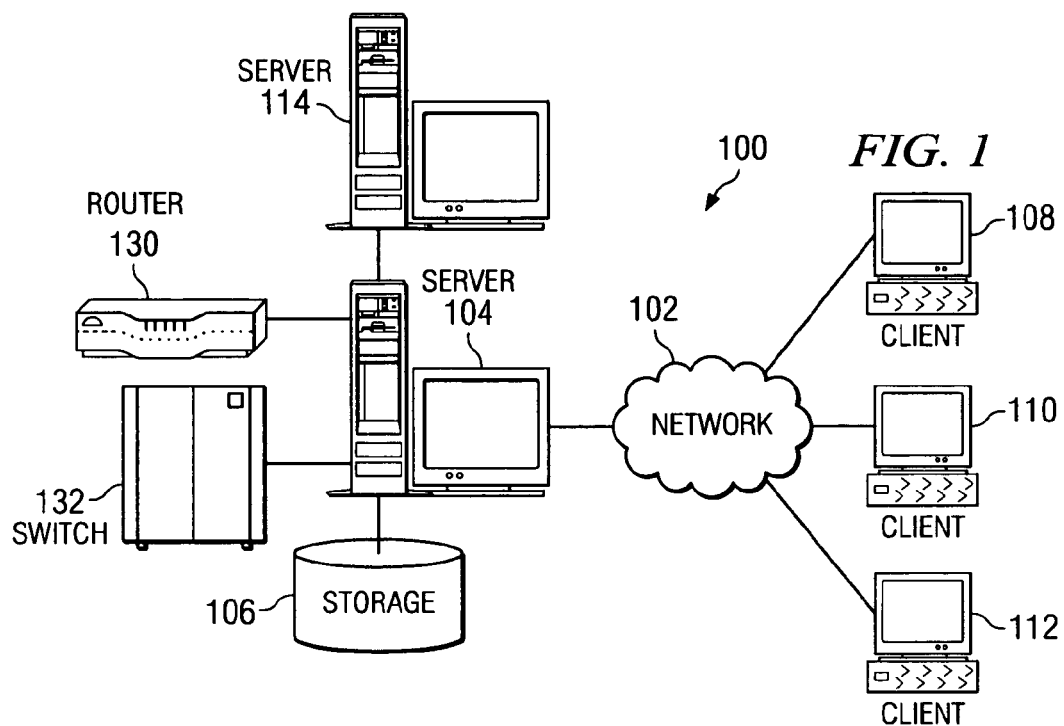
FIG. 1 depicts a pictorial representation of a network of data processing systems in which the present invention may be implemented.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit" or "module." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java7, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
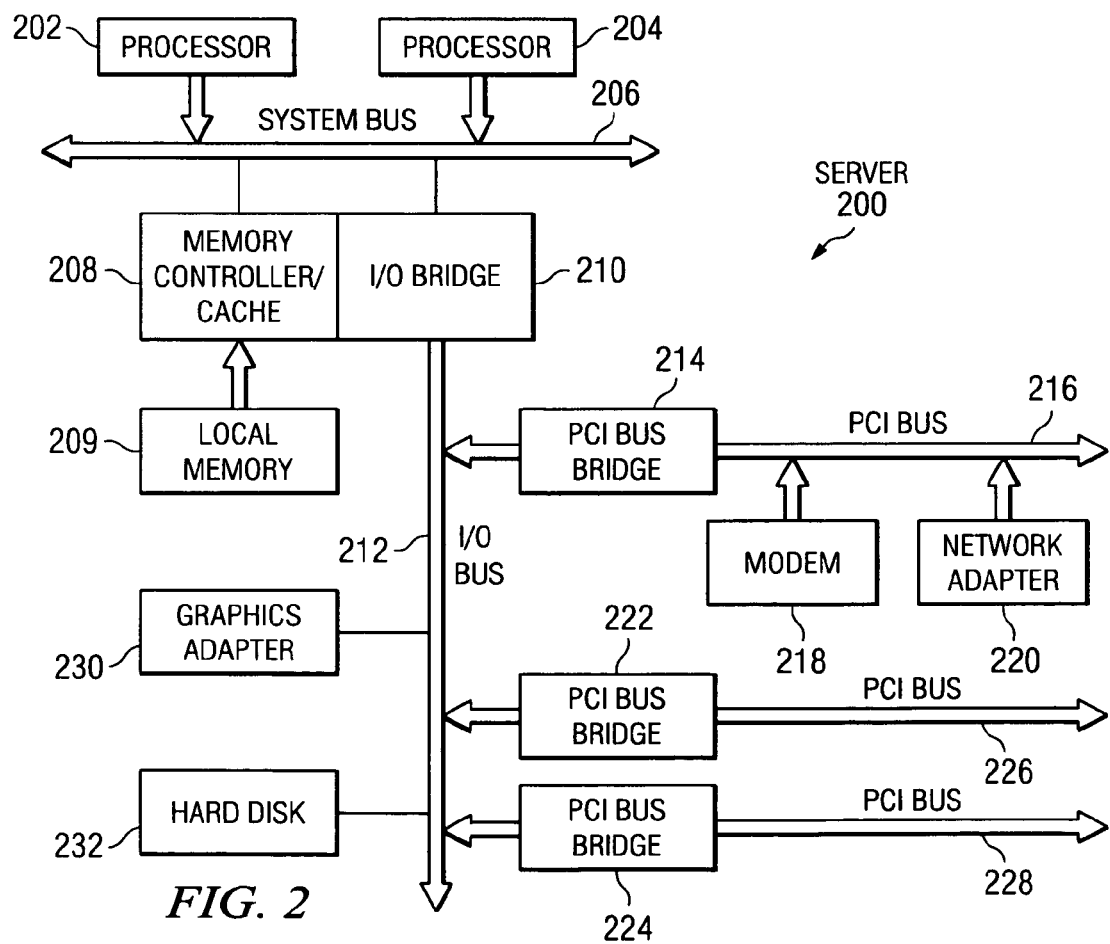
FIG. 2 is a block diagram of a data processing system that may be implemented as a server in accordance with an aspect of the present invention.

Referring to FIG. 2, a block diagram of a data processing system that may be implemented as a server, such as server 104 in FIG. 1, is depicted in accordance with an aspect of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer™ pSeries® system running the Advanced Interactive Executive (AIX®) operating system or LINUX operating system. IBM, pSeries and AIX are registered trademarks of International Business Machines Corporation (IBM) in the U.S. and/or other countries, eServer is a trademark of IBM in the US and/or other countries and LINUX is a trademark of Linus Torvalds in the U.S. and/or other countries.

Figure 3:
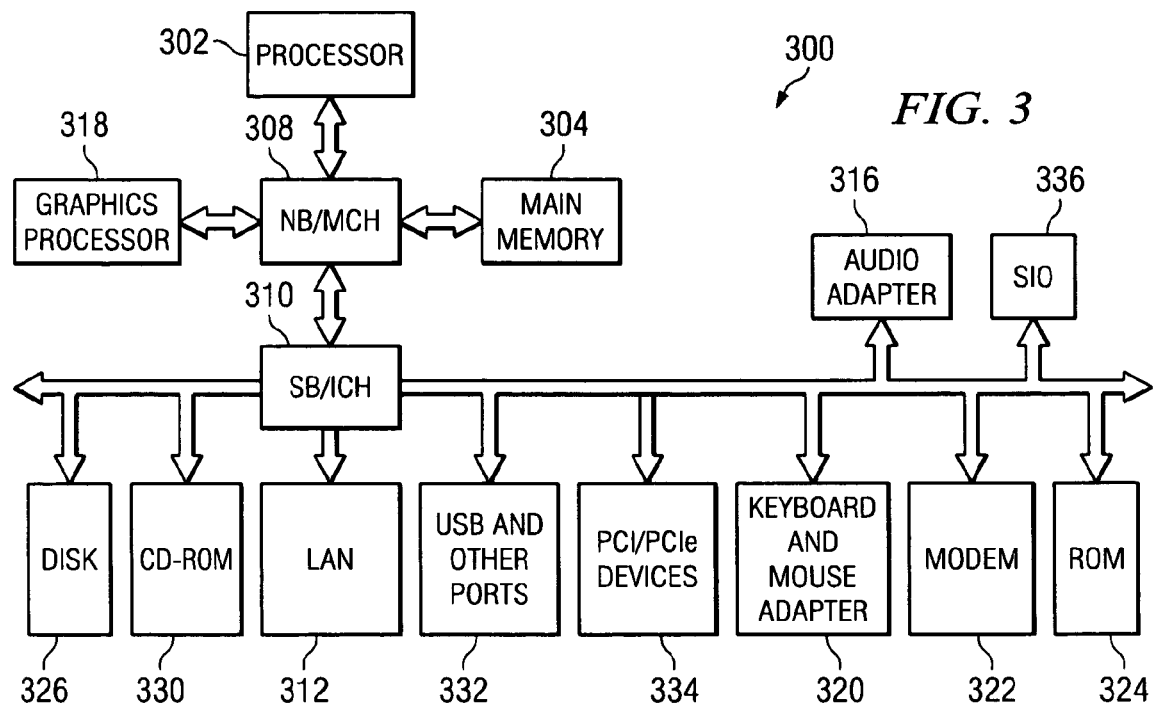
FIG. 3 is a block diagram of a data processing system is shown in which the present invention may be implemented.

With reference now to FIG. 3, a block diagram of a data processing system is shown in which the present invention may be implemented. Data processing system 300 is an example of a computer, such as client 108 in FIG. 1, in which code or instructions implementing the processes of the present invention may be located. In the depicted example, data processing system 300 employs a hub architecture including a north bridge and memory controller hub (MCH) 308 and a south bridge and input/output (I/O) controller hub (ICH) 310. Processor 302, main memory 304, and graphics processor 318 are connected to MCH 308. Graphics processor 318 may be connected to the MCH through an accelerated graphics port (AGP), for example.

In the depicted example, local area network (LAN) adapter 312, audio adapter 316, keyboard and mouse adapter 320, modem 322, read only memory (ROM) 324, hard disk drive (HDD) 326, CD-ROM driver 330, universal serial bus (USB) ports and other communications ports 332, and PCI/PCIe devices 334 may be connected to ICH 310. PCI/PCIe devices may include, for example, Ethernet adapters, add-in cards, PC cards for notebook computers, etc. PCI uses a cardbus controller, while PCIe does not. ROM 324 may be, for example, a flash binary input/output system (BIOS). Hard disk drive 326 and CD-ROM drive 330 may use, for example, an integrated drive electronics (IDE) or serial advanced technology attachment (SATA) interface. A super I/O (SIO) device 336 may be connected to ICH 310.

An operating system runs on processor 302 and is used to coordinate and provide control of various components within data processing system 300 in FIG. 3. The operating system may be a commercially available operating system such as Microsoft® Windows® XP. Microsoft and Windows are registered trademarks of Microsoft Corporation in the United States, other countries, or both. An object oriented programming system, such as the Java™ programming system, may run in conjunction with the operating system and provides calls to the operating system from Java™ programs or applications executing on data processing system 300. "JAVA" is a trademark of Sun Microsystems, Inc. in the United States, other countries, or both.

Instructions for the operating system, the object-oriented programming system, and applications or programs are located on storage devices, such as hard disk drive 326, and may be loaded into main memory 304 for execution by processor 302. The processes of the present invention are performed by processor 302 using computer implemented instructions, which may be located in a memory such as, for example, main memory 304, memory 324, or in one or more peripheral devices 326 and 330.

Those of ordinary skill in the art will appreciate that the hardware in FIG. 3 may vary depending on the implementation. Other internal hardware or peripheral devices, such as flash memory, equivalent non-volatile memory, or optical disk drives and the like, may be used in addition to or in place of the hardware depicted in FIG. 3. Also, the processes of the present invention may be applied to a multiprocessor data processing system.

For example, data processing system 300 may be a personal digital assistant (PDA), which is configured with flash memory to provide non-volatile memory for storing operating system files and/or user-generated data. The depicted example in FIG. 3 and above-described examples are not meant to imply architectural limitations. For example, data processing system 300 also may be a tablet computer, laptop computer, or telephone device in addition to taking the form of a PDA.

The present invention provides a method, apparatus and computer instructions for extracting Web services from resources using a Web services resource programming model. A resource may be a file or document that includes a reference to one or more Web services. A resource may include a reference to another resource. The programming model may include a set of classes representing different resource types. Example resource types include hypertext transfer markup language (HTML) resource, discovery of Web services (DISCO) resource, Web services description language (WSDL) resource, Web services inspection language (WSIL) resource, and universal description discovery and integration (UDDI) resource.

Each of the set of classes extends from a base class, named Web service resource, from which a set of default methods is inherited. These default methods perform common functions, such as, for example, getting and setting documentation on the resource, getting and setting a URI, populating and refreshing a cache, and a getting linked resources that are embedded within the current resource.

In the present programming model, a resource may either be a type of UDDI Web service resource or a type of URL document resource. A UDDI Web service resource class may represent either a query for UDDI services by name or by key. A URL document resource may represent a WSIL resource, a HTML resource, a DISCO resource or a WSDL resource. If the resource is a type of URL document resource, a Web services parser is provided in the programming model to parse the resource.

The Web services parser parses a resource by first reading the content referenced by the corresponding resource URI. Then, based on the resource content, the parser determines the resource type. In an aspect of the present invention, the programming model allows a user to parse the resource for a complete resource hierarchy, which includes all the resources that are referenced by the corresponding resource URI. In this case, the parser examines the resource type to determine whether the resource is a WSDL resource.

If the resource is not WSDL resource, the parser invokes a get linked resources method to retrieve embedded resources within the current resource. The get linked resources method then returns an array list of resources embedded in the current resource. Iteratively, each embedded resource of the list is passed to the parser to repeat the process until a WSDL resource is found or when all Web services resources are exhausted. In this way, the parser performs extraction of Web services, represented by WSDL resources, from different types of resources.

In another aspect of the present invention, the programming model allows a user to designate a level to which the parser parses the resource, herein referred to as designated type. For example, a user may designate the parser to parse the resource only to the second level. In yet another aspect of the present invention, the programming model allows a user to parse only certain types of resource, herein referred to as designated type. An example of a designated type includes a WSIL resource.

In addition to providing a set of classes and methods, the programming model of the present invention provides associations between classes that illustrate relationships between resources. For example, a HTML resource may contain WSIL resources and/or DISCO resources. In turn, the WSIL resource may contain UDDI query service resources and WSDL resources. The DISCO resource may also contain WSDL resources. In the present invention, the WSDL resource may be the lowest level of the hierarchy, because WSDL is currently the most common standard used to describe a Web service. As standards evolve, other leaf levels may be included in the present programming model for extensibility. Thus, the programming model depicts relationships representing a hierarchy of documents within which a Web service may be obtained.

The programming model of the present invention also provides a caching capability to temporarily store extracted resources within the programming model, such that subsequent Web services request may look to the cache for extracted resources for the given link prior to performing another extraction. The programming model also allows a user to refresh the cache to obtain the latest hierarchy of resources. In this way, the user can ensure that the embedded resources are valid.

Figure 4:
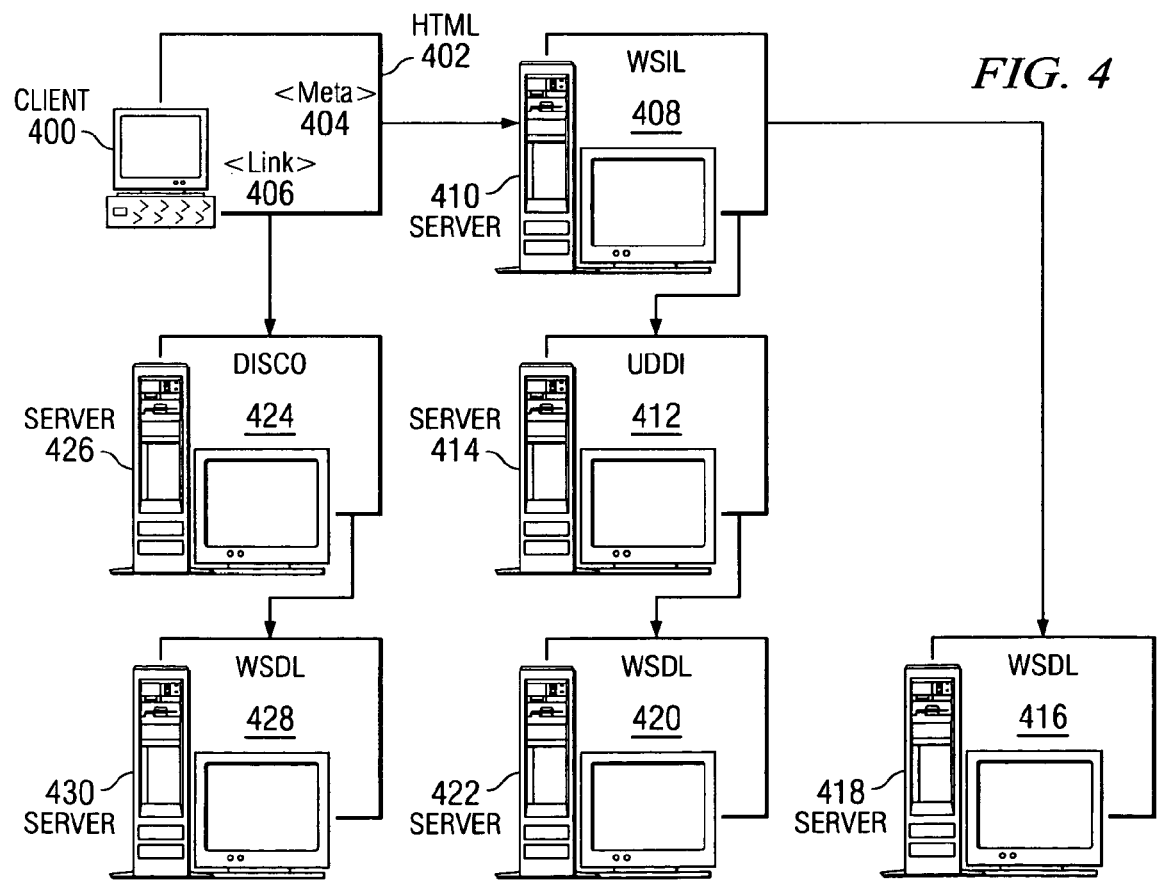
FIG. 4 is a diagram illustrating relationships between Web service resources in accordance with an aspect of the present invention.

Turning now to FIG. 4, a diagram illustrating relationships between Web service resources is depicted in accordance with an aspect of the present invention. As illustrated in FIG. 4, in this illustrative example, client 400 may be implemented as data processing system 300 in FIG. 3 and servers 410, 414, 418, 422, 426, and 430 may be implemented as data processing system 200 in FIG. 2. Client 400 may execute a client application, such as a HTML Web page 402, to perform services. HTML Web page 402 is an HTML resource from which Web services may be obtained. HTML Web page 402 includes 'meta' tag 404 and 'link' tag 406. 'Meta' tag 404 includes reference to content, such as, for example, WSIL file 408, which is a WSIL resource residing on server 410.

WSIL file 408 may also include linkage to other resources, such as UDDI service 412, which is a UDDI resource residing on server 414, and WSDL file 416, which is a WSDL resource residing on server 418. UDDI service 412 is a registry through which client 400 is able to discover Web services. In this example, one of the Web services discovered is WSDL file 420 residing on server 422.

In addition to 'meta' tag 404, HTML Web page 402 includes 'link' tag 406 that includes a reference to DISCO file 424, which is a DISCO resource residing on server 426. Within DISCO file 424, a link to WSDL file, such as, WSDL file 428 residing on server 430, may be embedded.

Thus, a hierarchy of resources is formed based on linkages between different resources. As more links are embedded within the resources, the hierarchy increases in depth. Currently, an application programmer has to apply logic internal to the client application, such as HTML Web page 402, to accommodate each type of resources. This becomes cumbersome and difficult to maintain as new resource types are developed and embedded links change.

Figure 5A:
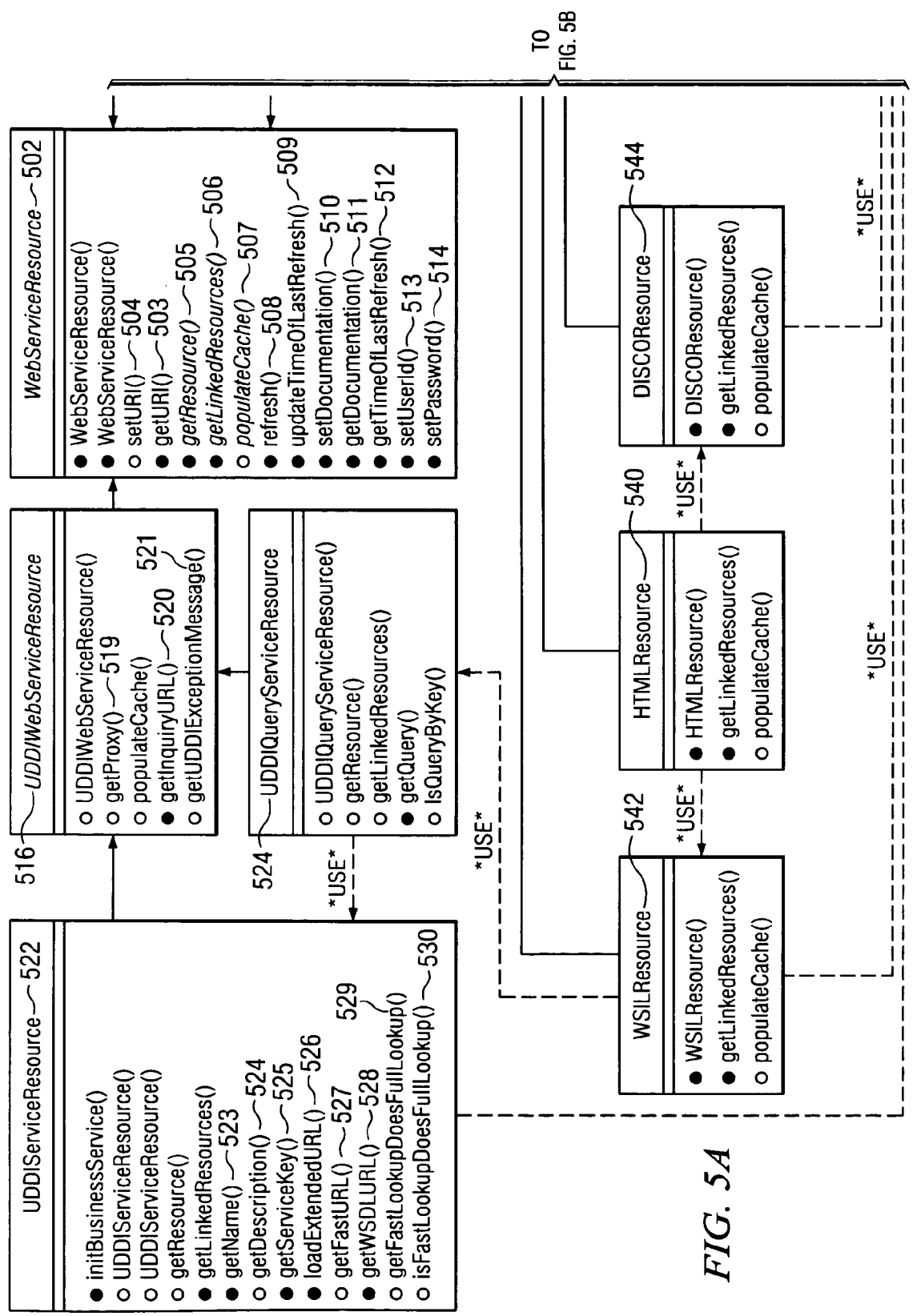
FIG. 5A is a diagram illustrating a Web service resource programming model in accordance with an aspect of the present invention.

Turning now to FIG. 5A, a diagram illustrating a Web service resource programming model is depicted in accordance with an aspect of the present invention. As shown in FIG. 5A, in this illustrative example, programming model 500 includes a base class, Web services resource 502. Web services resource 502 includes a set of default methods. The set of default methods includes get URI method 503, set URI method 504, get resource method 505, get linked resource method 506, populate cache method 507, refresh method 508, update time of last refresh method 509, set documentation method 510, get documentation method 511, get time of last refresh method 512, set user id method 513, and set password method 514.

Get URI method 503 is used to identify the URI or URL of each Web service resource. Set URI method 504 is used to designate the URI or URL for a particular resource. If the resource is a UDDI resource, a URI is used to identify the resource. Otherwise, a URL is used to identify the resource.

Get resource method 505 returns content of the resource to the user. For example, when a user invokes get resource method 505 on a HTML resource, a byte stream is returned to the user with content of the HTML file. Thus, the user may view the content of the HTML file by feeding the byte stream to a HTML viewer or editor.

Get linked resource method 506 performs extraction of Web services from a resource recursively by examining links that are embedded within the resource. Populate cache method 507 temporarily stores embedded resources to a cache, such that subsequent Web services requests may use already extracted resources instead of repeatedly performing extractions. Refresh method 508 is called by the user when the user wants to clear the cache and extract the embedded resources again. Refresh method 508 is useful when the user wants to obtain updated resources.

Update time of last refresh method 509 is called by populate cache method 507 in order to timestamp when the cache is last updated. In turn, get time of last refresh method 512 returns the timestamp set by update time of last refresh method 509 to a user. Set documentation method 510 and get documentation method 511 allows user to assign and retrieve documentation associated with a resource. Set user id method 513 and set password method 514 are allows user to set a user id and password such as, for example, a Hypertext transfer protocol (HTTP) basic authentication, for a protected resource.

In programming model 500, a Web service resource may either be a type of UDDI Web service resource 516 or a type of URL document resource 518. In addition to default methods inherited from Web service resource 502, UDDI Web service resource 518 includes get proxy method 519, get inquiry URL method 520 and get UDDI exception message method 521. Get proxy method 519 constructs a proxy that may be used by subclasses, such as UDDI service resource 522 and UDDI query service resource 524, to query the UDDI registry given an inquiry URL. The inquiry URL is retrieve by the subclasses using get inquiry URL method 520. Get UDDI exception message method 521 converts a UDDI exception message to a user-friendly message when a UDDI exception is encountered, such that the user may understand the content of the exception.

UDDI query service resource 524 represents a query for a UDDI service by a service name or other qualifiers, such as, for example, service key, owning business, and categorization. UDDI service resource 522 represents an actual UDDI service instance. In this illustrative example, programming model 500 uses UDDI service resource 522 to represent embedded resources within UDDI query service resource 524. Within UDDI service resource 522, embedded resources are represented by WSDL resource 532, which is the lowest level of the hierarchy. UDDI service resource 522 includes a number of attributes, such as a name, a description, and a service key. These attributes may be obtained by the user using get name method 523, get description method 524 and get service key method 525.

Since the lookup required to obtain the WSDL URL from a UDDI service is not instantaneous, UDDI service resource 522 also provides methods, such as, load extended URL method 526, get fast URL method 527, get WSDL URL method 528, set fast lookup does full lookup method 529, and is fast lookup does full lookup method 530, to manage and provide feedback to the user during the lookup. Load extended URL method 526 allows a user to resolve the WSDL URL to ensure its correctness. Get fast URL method 527 delegates to load extended URL method 526 if the fast lookup does full lookup is true to validate the WSDL URL. Otherwise, get fast URL method 527 delegates to get WSDL URL method 528 to retrieve the WSDL URL. Get WSDL URL method 528 returns the URL of the WSDL from the UDDI registry. Set fast lookup does full lookup method 529 enables the user to change the lookup process from a fast lookup to a full lookup and is fast lookup does full lookup method 530 enables the user to query whether the lookup process is currently performing a fast or full lookup.

Figure 5B:
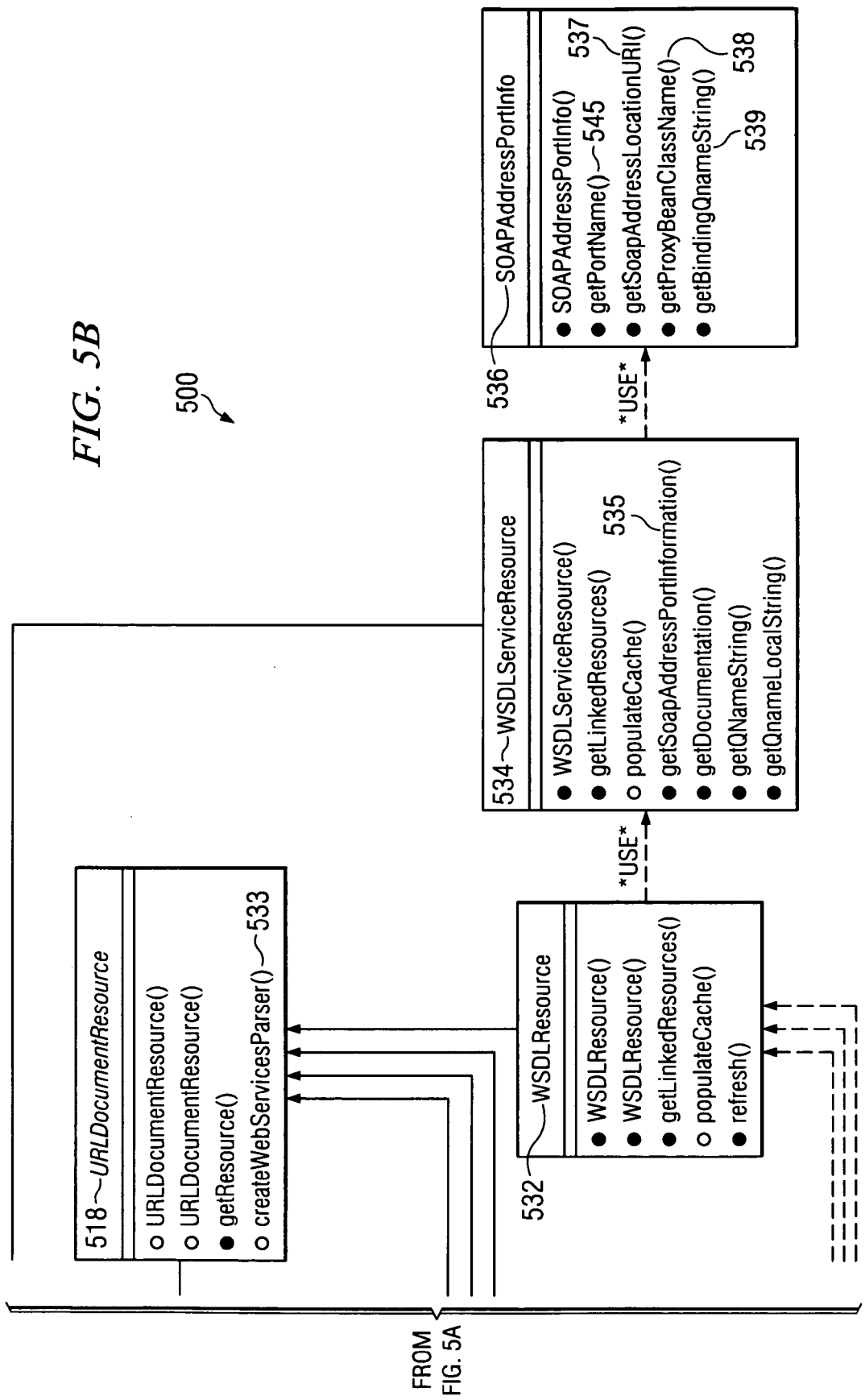
FIG. 5B is a diagram illustrating a Web service resource programming model in continuation of FIG. 5A in accordance with an aspect of the present invention.

Turning now to FIG. 5B, a diagram illustrating a Web service resource programming model in continuation of FIG. 5A is depicted in accordance with an aspect of the present invention. As shown in FIG. 5B, in this illustrative example, other than UDDI resources, programming model 500 represents remaining resources as a type of URL document resource 518. URL document resource 518 includes a create web service parser method 533, which creates a Web service parser that parses embedded resources based on an input URL. Typically, the input URL is given by the user, which is analyzed by the Web services parser by connecting to the Web service resource and determining the type of resource.

The Web service parser then calls the get linked resource method of the resource determined and obtains an iterator of Web services resources embedded within the resource determined. If the user wants to obtain a complete resource hierarchy, the parser recursively calls the get linked resource method of the embedded resource until a WSDL service resource is obtained and no other resource is embedded. If the user wants to parse only to a designated level or a designated type of resource, the parser recursively calls the get linked resource method of the embedded resource until either all embedded resources within the designated level are obtained or all embedded resources of the designated resource type are obtained.

Since Web services resource, such as WSIL and DISCO resource, may contain linked resource of the same type, which could potentially result in a cycle, the Web service parser of the present invention detects these cycles and prevents infinite recursion.

The Web services parser keeps a cached copy of a resource instance when the parser first parses the reference. This is achieved by maintaining a table of reference URI to the resource instance. When parser parses embedded references of a resource, the parser performs a lookup in its cache, which is the table of reference URIs to Web service resources, to see if the reference URI already exists. If the reference URI already exists in the table, the parser returns corresponding resource instance from the table instead of parsing the same reference URI again. In this way, infinite cycles are prevented.

When extraction of resources is complete, a list of WSDL resources 532 is obtained. WSDL resource 532 may link to zero or more WSDL service resources 534. Each WSDL service resource 534 represents a service element defined in the WSDL file of the resource, which may be scoped to a particular namespace and have associated documentation.

A user may interact with Web services by obtaining zero or more SOAP address port information 536 from WSDL service resource 534 using get SOAP address port information method 535. SOAP address port information 536 includes attributes, such as, a port name, a SOAP address location URI, a proxy class bean name and binding QName string. These attributes are then accessible by the user using get port name method 545, get SOAP address location URI method 537, get proxy bean class name method 538, get binding QName string method 539. Specifically, get proxy bean class name method 538 returns a fully qualified Java class name of a proxy through which the user may invoke operations offered by corresponding Web services. Using these attributes, a user may obtain an instance of a Web service.

Rather than merely providing a set of classes and methods, programming model 500 also provides associations necessary to illustrate relationships between different Web service resources. In this illustrative example, HTML resource 540 in FIG. 5A may include WSIL resource 542 and DISCO resource 544. WSIL resource 542 may in turn include a UDDI query service resource 524, another WSIL resource 542 or WSDL resource 532. Similarly, DISCO resource 544 may include WSDL resource 532.

Thus, using the programming model of the present invention, an application developer may extend the model to accommodate future Web service types by including additional UDDI resource type, URL document resource type, or any other resource type. The programming model also enables application programmer to extract resources by defining a set of classes and methods. The set of classes represents different resource types. The set of methods provides functions necessary to parse an input URL or recursively retrieve linked resources. Furthermore, the programming model enables the application programmer to manage extraction by providing a cache that temporarily stores already extracted resources.

Turning now to FIG. 6, a diagram illustrating an exemplary HTML resource is depicted in accordance with an aspect of the present invention. As depicted in FIG. 6, HTML 600 may be a Web page used by a client, such as client 400 in FIG. 4. HTML 600 includes two tags, 'meta' tag 602 and 'link' tag 608. 'Meta' tag 602 includes an embedded content named service inspection 604, which is a WSIL file named 'inspection.wsil' 606. 'Inspection.wsil' 606, according to the WSIL specification, is a WS-Inspection document that provides an aggregation of references to service descriptions. These service descriptions can be defined in any service description format, such as WSDL, UDDI, or plain HTML. 'Inspection.wsil' 606 is a WS-Inspection document that is generally made available at the point-of-offering for the services that are referenced within the document. 'Link' tag 608 also includes an embedded reference to a text/xml file, which is a DISCO file named 'disco.disco' 610.

Turning now to FIG. 7, a diagram illustrating an exemplary WSIL resource is depicted in accordance with an aspect of the present invention. As illustrated in FIG. 7, in this illustrative example, WSIL file 700 represents 'inspection.wsil' 606 file in FIG. 6. WSIL file 700 includes a number of embedded resources. The embedded resources include webservice1.wsdl, which is a WSDL resource 702, a UDDI service 704, a UDDI business 706, and 'link' tag 708. 'Link' tag 708 embeds yet another WSIL resource, named 'inspectionLink.wsil' 710.

Turning now to FIG. 8, a diagram illustrating an exemplary embedded WSIL resource is depicted in accordance with an aspect of the present invention. As illustrated in FIG. 8, in this illustrative example, WSIL file 800 represents 'inspectionLink.wsdl' file 710 in FIG. 8. WSIL file 800 includes an embedded WSDL file, named webservices2.wsdl 802.

Turning now to FIG. 9, a diagram illustrating an exemplary DISCO resource is depicted in accordance with an aspect of the present invention. As illustrated in FIG. 9, in this illustrative example, DISCO file 900 represents 'disco.disco' file 610 in FIG. 6. DISCO file 900 includes two embedded WSDL files, 'webservice1.wsdl' 902 and 'webservice2.wsdl' 904.

Turning now to FIG. 10, a diagram illustrating an exemplary hierarchy of resources is depicted in accordance with an aspect of the present invention. As illustrated in FIG. 10, in this illustrative example, index.html 1002 is at the highest level of hierarchy 1000. Index.html 1002 represents HTML 600 in FIG. 6. Typically, the URL of the HTML resource is passed in by the user and the Web service parser provided by the present invention parses the file for embedded resources. However, other types of URLs may also be passed in by the user, for example, WSIL URLs and DISCO URLs. In this example, 'inspection.wsil' 1004, which represents WSIL file 700 in FIG. 7, and 'disco.disco' 1006, which represents DISCO file 900 in FIG. 9, are embedded in the second level of hierarchy 1000.

At the third level of hierarchy 1000, UDDI service 1006, UDDI business 1008, webservice1.wsdl 1010 and inspectionLink.wsil 1012 are all embedded within inspection.wsil 1004. Also at the third level, webservice1.wsdl 1014 and webservice2.wsdl 1016 are embedded within disco.disco 1006. Finally, at the fourth level, only webservice2.wsdl 1018 is embedded within inspectionLink.wsil 1012.

As one of ordinary skill in the art will appreciate, the levels of hierarchy may increase as more resources are embedded within resources. The programming model of the present invention addresses this complexity by iteratively collecting resources within each level of the hierarchy using a Web service parser and get linked resource methods. Thus, the programming model simplifies the problem by providing methods that perform extractions and providing the user with a list of extracted resources.

Turning now to FIG. 11, an exemplary program using Web services resource programming model to return a list of embedded resources is depicted in accordance with an aspect of the present invention. As depicted in FIG. 11, in this illustrative example, program 1100 may be implemented on client 400 in FIG. 4 to extract a list of resources for client 400. program 1100 includes vector 1102, named wsdls, which is used to store all the WSDL resources extracted from a given input URL. Program 1100 then instantiates Web services parser 1104 to extract all WSDL resources. Once Web services parser is instantiated, program 1100 invoked parse method 1106 of parser 1104 to parse the URI of a Web service resource. In this case, the URI of the Web service resource is the URL of index.html 1108. Parse method 1106 returns a current resource that corresponds to index.html URL 1108.

Next, program 1100 continues to gather all the WSDL resources by invoking a gather WSDLs method 1110. Gather WSDLs method 1110 is represented by block 1112. Gather WSDLs method 1110 receives a Web service resource and a vector as input parameters. Gather WSDLs method 1110 first checks to see the current resource is an instance of WSDL resource 1114. This is to determine if the current resource is at the lowest level of the hierarchy. If the current resource is an instance of WSDL resource, the current resource is added to vector 1112.

If the current resource is not an instance of WSDL resource, meaning that there are lower levels of resources in the hierarchy, program 1100 invokes a get linked resources method 1116 to examine all embedded resources within the current resource and this method returns an array list of embedded resources.

Get linked resources method 1116 is represented by block 1118. Get linked resources method implementation varies between types of Web service resource. For example, a HTML resource may reference WSIL or DISCO resources. A WSIL resource may reference UDDI, WSIL or WSDL resources. In general, get linked resources method 1116 uses the Web service parser to iterate or parse the reference URI of each embedded resource.

In this illustrative example, get linked resources method 1116 first checks the cache to determine if the cache includes any data. If not, method 1116 creates a new instance of a Web services parser 1120 if the parser not already exists or reuse a current parser and invokes the parser's get Web service entity by URI method 1122. A Web service entity is similar to a Web service resource in that Web service entity is used internally by the parser and Web service resource is used externally to be passed back to the client application. Get Web service entity by URI method 1122 checks the table in the cache and determines if the HTML resource reference URI, in this case, is already parsed. If it is, method 1122 returns the cached HTML resource. If not, method 1122 returns a null value. Once get Web service entity by URI method 1122 obtains a HTML resource, populate cache method 1124 is invoked to populate the cache with the HTML resource.

Block 1118 then continues to invoke get linked resources method 1116 to create a new array list for the size of the cache data and copy the extracted resources from the cache into the array list. Method 1116 then returns the array list of Web service resources.

Finally, program 1110 iterates the array list returned from method 1116 and gathers lower level WSDL resources by recursively calling gather WSDLs method 1110 until all WSDL resources have been gathered. Thus, this example illustrates how a user may use the programming model to gather all WSDL resources by iteratively invoking gather WSDLs method 1110.

Turning now to FIG. 12, an exemplary program using Web services resource programming model to build a graphical tree is depicted in accordance with an aspect of the present invention. As depicted in FIG. 12, in this illustrative example, program 1200 first instantiates Web services parser 1202 and then invokes parse method of Web services parser 1202 to parse the URL of a Web service resource. In this example, the Web service resource is an HTML file, named index.html 1204.

Next, program 1200 invokes create tree node method 1206, which is represented by block 1208. Create tree node method 1206 examines the current resource and determines if the current resource is an instance of one of the resource types described in the programming model, such as programming model 500 in FIG. 5.

In this example, create tree node method 1206 first checks to see if the current resource is a HTML resource 1210. If the current resource is a HTML resource, program 1200 invokes create HTML tree node method 1211, which processes the HTML resource, for example, by displaying the content of the HTML document using a get resource method.

If the current resource is not a HTML resource, program 1200 continues to check if the current resource is an instance of UDDI service resource 1212. If the current resource is a UDDI service resource, program 1200 invokes create UDDI tree node method 1211, which processes the UDDI service resource, for example, by displaying the service key of the UDDI service using a get service key method.

If the current resource is not a UDDI service resource program 1200 continues to check if the current resource is one of a WSIL resource 1214, DISCO resource 1216, and WSDL resource 1218. If the current resource is one of these resources, program 1200 invokes create WSIL tree node method 1215, create DISCO tree node method 1217, and create WSDL tree node method 1219, respectively to process the current resource.

Figure 13:
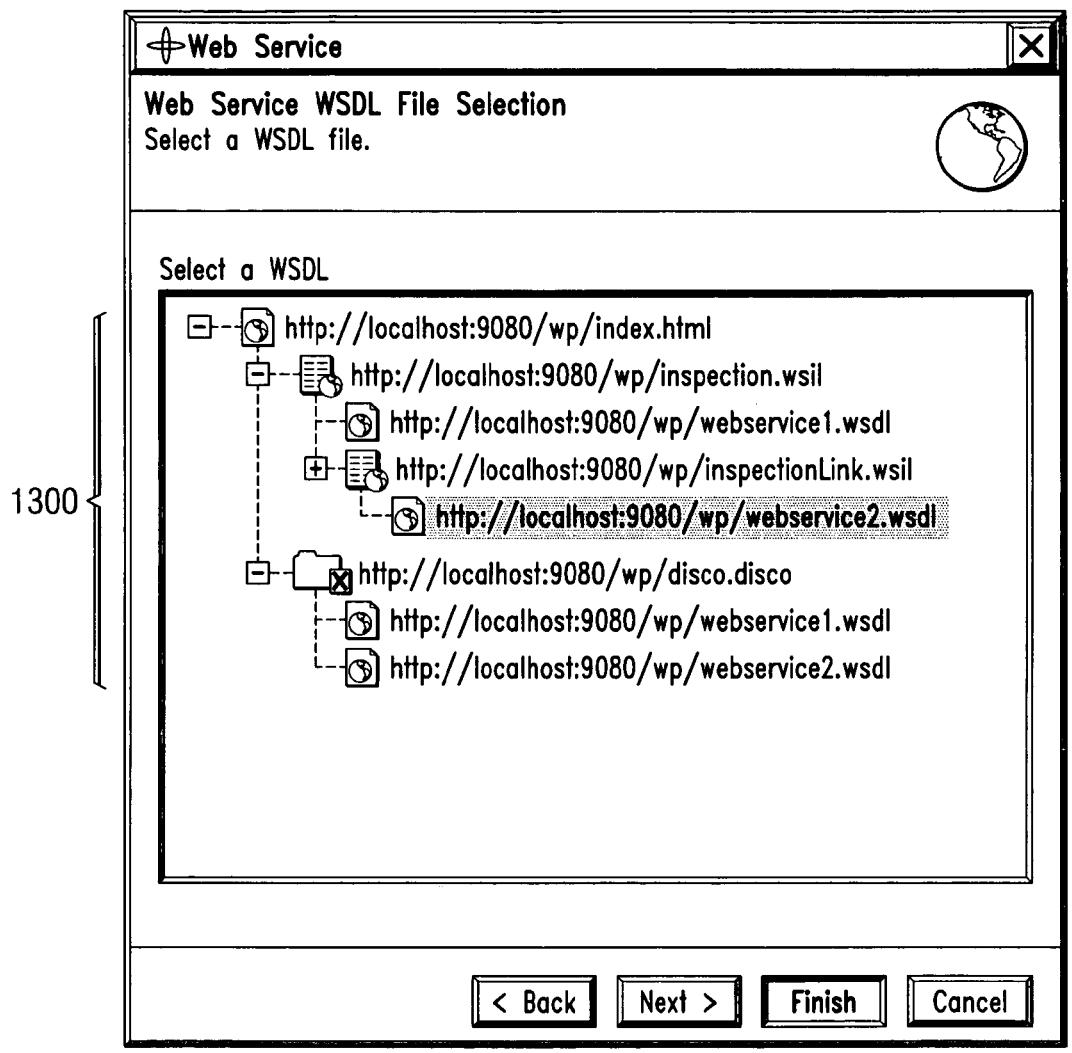
FIG. 13 is an exemplary graphical tree view is depicted in accordance with an aspect of the present invention.

Turning now to FIG. 13, an exemplary graphical tree view is depicted in accordance with an aspect of the present invention. As depicted in FIG. 13, in this illustrative example, graphical tree 1300 may be generated using executing program 1200 in FIG. 12, which utilizes the programming model of the present invention. Graphical tree 1300 depicts hierarchy of resources, similar to hierarchy 1000 in FIG. 10.

Figure 14:
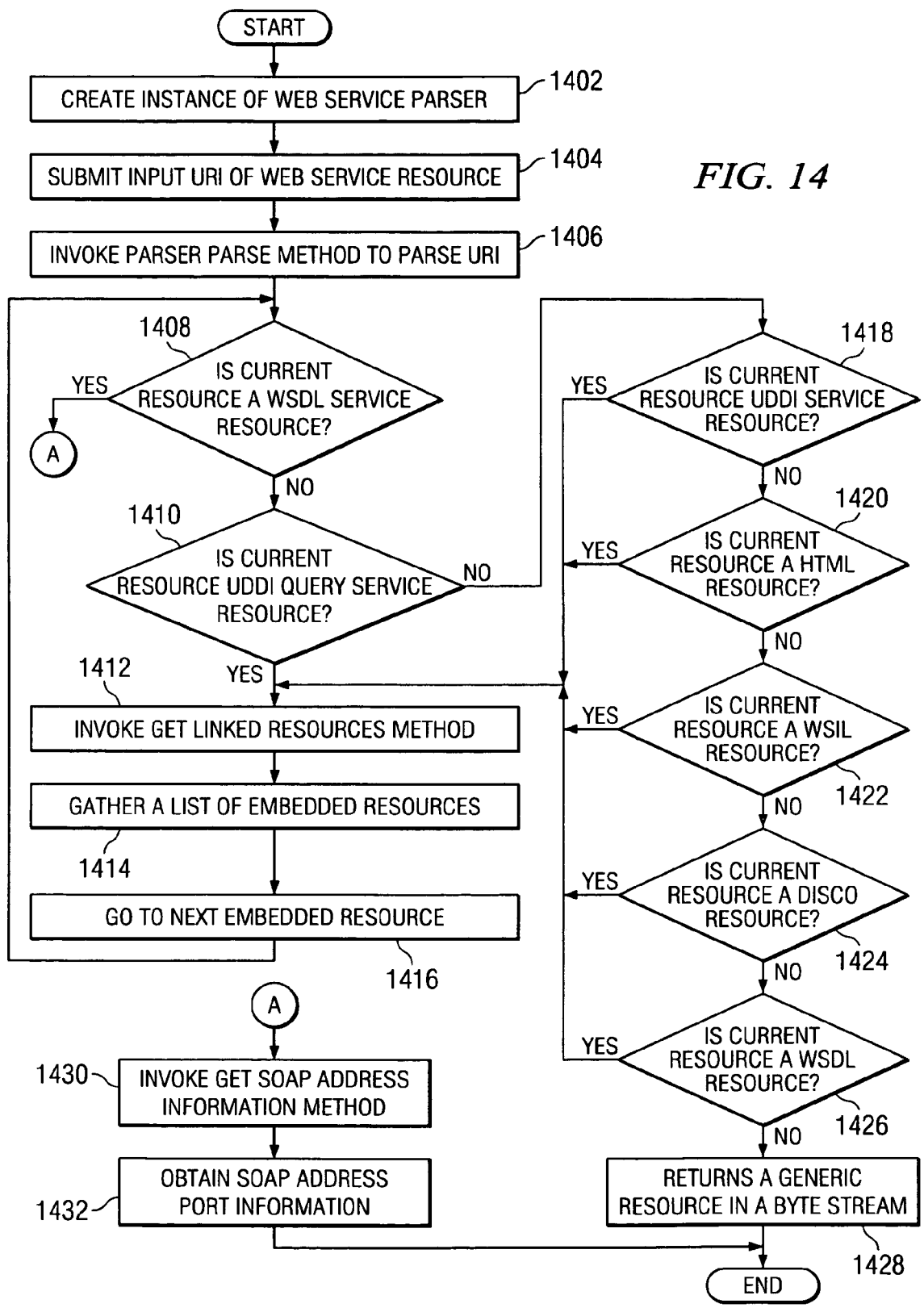
FIG. 14 is a flowchart of a process for extracting Web services from resources using Web service resource programming model in accordance with an aspect of the present invention.

Turning now to FIG. 14, a flowchart of a process for extracting Web services from resources using Web service resource programming model is depicted in accordance with an aspect of the present invention. As depicted in FIG. 14, from the client's perspective, the process begins when the client program creates an instance of Web service parser (step 1402). The client then submits a URI of a Web service resource (step 1404). Next, the client invokes parse method of the parser to parse the URI (step 1406).

The parser first makes a determination as to whether the current resource is a WSDL service resource (step 1408). WSDL service resource is the lowest level of the hierarchy. If the current resource is not a WSDL service resource, the parser then determines whether the current resource is a UDDI query resource (step 1410). If the current resource is a UDDI query service resource, the process continues to step 1412.

If the current resource is not a UDDI query service resource, the parser determines if the current resource is a UDDI service resource (step 1418). If the current resource is a UDDI service resource, the process continues to step 1412. Otherwise, the parser determines if the current resource is a HTML resource (step 1420). If the current resource is a HTML resource, the process continues to step 1412. Otherwise, the parser determines if the current resource is a WSIL resource (step 1422).

If the current resource is a WSIL resource, the process continues to step 1412. Otherwise, the parser determines if the current resource is a DISCO resource (step 1424). If the current resource is a DISCO resource, the process continues to step 1412. Otherwise, the parser determines if the current resource is a WSDL resource (step 1426). If the current resource is a WSDL resource, the process continues to step 1412. Otherwise, no current resource types matches the current resources, the parser then returns a generic resource type in a byte stream to the user (step 1428) and the process terminating thereafter.

At step 1412, the client invokes a get linked resources method on the current resource and gathers a list of embedded resources within the current resource (step 1414). Alternatively, the client may invoke get linked resources method on the current resource to parse only the designated level of the resource. This provides an option for the user to designate the parser to parse a certain level of the resource hierarchy. The client then iterates the list of embedded resources by going to the next embedded resource in the list and repeat step 1408. Steps 1408 through 1426 are repeated until the last element of the list is examined.

Turning back to step 1408, if the current resource is a WSDL service resource, the process continues to step 1430 to invoke get SOAP address info method to obtain SOAP address port information (step 1432) and the process terminating thereafter.

In summary, the present invention provides a programming model that allows application programmers to easily extract Web services from resources of various types. Using the programming model, application programmers may extend resource types without changing underlying client logic. Application programmer may also use the caching capability to quickly refer to a list of Web services resources without repeatedly performing extractions. Thus, the present invention programmatically enhances efficiency of client access to Web services regardless of Web services resource types.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for extracting Web services from resources of various types using a programming model, the method comprising:
   receiving a request from a user for extraction of Web services from resources of various types, wherein each resource is a file or document that includes a reference to one or more Web services and each resource may include a reference to one or more other resources;
   invoking a Web service parser of the programming model to parse the request to determine a type of each resource, wherein the programming model is extendable to accommodate additional resource types; and
   determining other resources referenced by each resource based on the type of the resource.

2. The method of claim 1, wherein in response to determining the resource comprises other resources, the method further comprising:
   invoking a get linked resources routine of the programming model to retrieve other resources from the resource;
   retrieving a list of resources from the routine; and
   returning Web services from the list of resources to the user.

3. The method of claim 2, wherein the get linked resources routine of the programming model is recursively invoked until no other resources are included in the other resources.

4. The method of claim 2, wherein the get linked resources routine of the programming model is recursively invoked until all other resources of a designated level are retrieved.

5. The method of claim 2, wherein the get linked resources routine of the programming model is recursively invoked until all other resources of a designated type of resource are retrieved.

6. The method of claim 1, wherein the Web service parser of the programming model determines the type of the resource by determining if the resource is an instance of one of a set of Web services resources.

7. The method of claim 6, wherein the set of Web services resources comprises hypertext markup language resource, a Web service inspection language resource, a universal description discovery integration resource, a Web service description language resource, and a discovery of Web services resource.

8. The method of claim 1, wherein the request from the user comprises a reference of the resource and wherein the reference is in a uniform resource identifier format.

9. The method of claim 8, wherein the Web service parser of the programming model parses the request by reading content of the reference and returning an instance of a resource in the content.

10. The method of claim 9, wherein returning an instance of a resource in the content comprises invoking a get Web service entity method.

11. The method of claim 10, wherein the get Web service entity method comprises examining a cache in the data processing hardware system and determining if the reference of the resource exists in the cache.

12. The method of claim 11, wherein in response to determining the reference of the resource exists in the cache and returning an instance of Web service resource corresponding to the reference from the cache, the method further comprising creating a new instance of Web service resource and placing the new Web service resource instance in the cache.

13. The method of claim 1, wherein determining if the resource comprises other resources based on the type of the resource comprises determining if the type of the resource is a Web service description language resource.

14. The method of claim 3, wherein the get linked resources routine of the programming model is recursively invoked until no other resources are included in the other resources comprises:
    obtaining an iterator of other resources from the resource; and
    repeating the invoking step and the determining step for each iterated resource from the iterator until no other resources are included in each iterated resource.

15. The method of claim 2, wherein returning Web services from the list of resources to the user comprises retrieving a plurality of uniform resource identifier locations from the list of resources.

16. The method of claim 7, wherein the hypertext markup language resource comprises at least one of a Web service inspection language resource and a discovery of Web service resource.

17. The method of claim 7, wherein the Web service inspection language resource comprises at least one of a universal description discovery integration resource, a Web service description language resource, and another Web service inspection language resource.

18. The method of claim 7, wherein the universal description discovery integration resource comprises at least a Web service description language resource.

19. The method of claim 7, wherein the discovery of Web services resource comprises at least a Web service description language resource.

20. The method of claim 7, wherein the Web service description language resource comprises at least a Web services description language service resource.

21. The method of claim 20, wherein the Web services description language service resource comprises a simple object access protocol address port information object, and wherein the simple object access protocol address port information object comprises at least one of port name and a simple object access protocol uniform resource identifier location.

22. The method of claim 4, wherein the designated level is designated in the request from a user, and wherein the designated level is a level of the resource hierarchy.

23. The method of claim 5, wherein the designated type of resource is designated in the request from a user, and wherein the designated type is selected from one of a hypertext markup language resource, a Web service inspection language resource, a universal description discovery integration resource, a Web service description language resource, or a discovery of Web services resource.

24. The method of claim 4, wherein the get linked resources routine of the programming model is recursively invoked until all other resources of a designated level are retrieved comprises:
  obtaining an iterator of other resources from the resource; and
  repeating the invoking step and the determining step for each iterated resource from the iterator until all resources of the designated level are iterated.

25. The method of claim 5, wherein the get linked resources routine of the programming model is recursively invoked until all other resources of a designated type of resource are retrieved comprises:
  obtaining an iterator of other resources from the resource; and
  repeating the invoking step and the determining step for each iterated resource from the iterator until no other resources of the designated type are included in each iterated resource.

26. A data processing system for extracting Web services from resources of various types using a programming model, the data processing system comprising:
  a processor configured to perform the operations of
    receiving a request from a user for extraction of Web services resources of various types, wherein each resource is a file or document that includes a reference to one or more Web services and each resource may include a reference to one or more other resources;
    invoking a Web service parser of the programming model to parse the request to determine a type of each resource, wherein the programming model is extendable to accommodate additional resource types; and
    determining other resources referenced by each resource based on the type of the resource.

27. The data processing system of claim 26, wherein the processor is further configured to perform the operations of:
  invoking a get linked resources routine of the programming model to retrieve other resources from the resource;
  retrieving a list of resources from the routine; and
  returning Web services from the list of resources to the user.

28. The data processing system of claim 27, the get linked resources routine is recursively invoked until no other resources are included in the other resources.

29. The data processing system of claim 27, wherein the get linked resources routine is recursively invoked until all other resources of a designated level are retrieved.

30. The data processing system of claim 27, wherein the get linked resources routine is recursively invoked until all other resources of a designated type of resource are retrieved.

31. The data processing system of claim 28, wherein the recursive invoking comprises:
  obtaining an iterator of other resources from the resource; and
  repeating the invoking and the determining for each iterated resource from the iterator until no other resources are included in each iterated resource.

32. The data processing system of claim 29, wherein the recursive invoking comprises:
  obtaining an iterator of other resources from the resource; and
  repeating the invoking and the determining for each iterated resource from the iterator until all resources of the designated level are iterated.

33. The data processing system of claim 30, wherein the recursive invoking comprises:
  obtaining an iterator of other resources from the resource; and
  repeating the invoking and the determining for each iterated resource from the iterator until no other resources of the designated type are included in each iterated resource.

34. A computer-readable storage medium comprising a memory device having stored therein instructions for extracting Web services from resources of various types using a programming model, the instructions, which when executed by a computer system, cause the computer system to perform:
  receiving a request from a user for extraction of Web services from resources of various types, wherein each resource is a file or document that includes a reference to one or more Web services and each resource may include a reference to one or more other resources;
  invoking a Web service parser of the programming model to parse the request to determine a type of each resource, wherein the programming model is extendable to accommodate additional resource types; and
  determining other resources referenced by each resource based on the type of the resource.

35. The computer-readable storage medium of claim 34, wherein in response to determining the resource comprises other resources, the computer system is further caused to:
  invoke a get linked resources routine of the programming model to retrieve other resources from the resource;
  retrieve a list of resources from the routine; and
  return Web services from the list of resources to the user.

36. The computer-readable storage medium of claim 35, wherein the get linked resources routine of the programming model is recursively invoked until no other resources are included in the other resources.

37. The computer-readable storage medium of claim 35, wherein the get linked resources routine of the programming model is recursively invoked until all other resources of a designated level are retrieved.

38. The computer-readable storage medium of claim 35, wherein the get linked resources routine of the programming model is recursively invoked until all other resources of a designated type of resource are retrieved.

39. The computer-readable storage medium of claim 36, wherein recursively invoking the get linked resources routine until no other resources are included in the other resources comprises:
  obtaining an iterator of other resources from the resource; and
  repeating the invoking and the determining for each iterated resource from the iterator until no other resources are included in each iterated resource.

40. The computer-readable storage medium of claim 37, wherein recursively invoking the get linked resources routine until all other resources of a designated level are retrieved comprises:
  obtaining an iterator of other resources from the resource; and
  repeating the invoking and the determining for each iterated resource from the iterator until all resources of the designated level are iterated.

41. The computer-readable storage medium of claim 38, wherein recursively invoking the get linked resources routine until all other resources of a designated type of resource are retrieved comprises:
 obtaining an iterator of other resources from the resource; and
 repeating the invoking and the determining for each iterated resource from the iterator until no other resources of the designated type are included in each iterated resource.

* * * * *